United States Patent [19]

Rippel et al.

[11] 4,275,130
[45] Jun. 23, 1981

[54] BIPOLAR BATTERY CONSTRUCTION

[75] Inventors: Wally E. Rippel, Sierra Madre; Dean B. Edwards, Pasadena, both of Calif.

[73] Assignee: California Institute of Technology, Pasadena, Calif.

[21] Appl. No.: 79,476

[22] Filed: Sep. 27, 1979

[51] Int. Cl.³ ............................................. H01M 6/48
[52] U.S. Cl. ................................... 429/144; 429/154; 429/210; 429/234
[58] Field of Search ........ 429/210, 234, 235, 152–154, 429/144

[56] References Cited

U.S. PATENT DOCUMENTS

| Re. 25,913 | 11/1965 | Solomon et al. | 429/210 X |
|---|---|---|---|
| 2,969,315 | 1/1961 | Bacon | 429/210 X |
| 3,141,795 | 7/1964 | Eisler | 429/210 X |
| 3,202,545 | 8/1965 | Emeriat | 429/212 |
| 3,390,014 | 6/1968 | Eisler | 420/210 X |
| 3,466,193 | 9/1969 | Hughel | 429/211 |
| 3,565,694 | 2/1971 | Chireau | 429/210 |
| 3,817,788 | 6/1974 | Eckerbom et al. | 429/210 X |
| 3,819,412 | 6/1974 | Taylor et al. | 429/210 |
| 4,098,967 | 7/1978 | Biddick et al. | 429/210 |
| 4,197,178 | 4/1980 | Pellegri et al. | 429/210 |

Primary Examiner—Anthony Skapars
Attorney, Agent, or Firm—Poms, Smith, Lande & Rose

[57] ABSTRACT

A lightweight, bipolar battery construction for lead acid batteries in which a plurality of thin, rigid, biplates each comprise a graphite fiber thermoplastic composition in conductive relation to lead stripes plated on opposite flat surfaces of the plates, and wherein a plurality of nonconductive thermoplastic separator plates support resilient yieldable porous glass mats in which active material is carried, the biplates and separator plates with active material being contained and maintained in stacked assembly by axial compression of the stacked assembly. A method of assembling such a bipolar battery construction.

31 Claims, 6 Drawing Figures

BIPOLAR BATTERY CONSTRUCTION

ORIGIN OF THE INVENTION

The invention described herein was made in the performance of work under a NASA contract and is subject to the provisions of Sections 305 of the National Aeronautics and Space Act of 1958, public law 83-568 (72 Statute 435; 42 U.S.C. 2454).

BACKGROUND OF INVENTION

A conventional bipolar battery generally includes electrodes having a metallic substrate on which positive active material forms one surface and negative active material forms the opposite surface. The active materials are retained by various means on the metal conductive substrate which is nonconductive to electrolyte ions. The electrodes are arranged in parallel stacked relation to provide a multicell battery with electrolyte and separator plates providing an interface between adjacent electrodes. Conventional monopolar electrodes, used at the ends of the stack are electrically connected with the output terminals. While achieving respectable power densities, these conventional bipolar battery designs suffer substrate corrosion, seal and active material retention problems. For these reasons, bipolar versions of the standard lead acid battery have failed to gain commercial success.

Most bipolar efforts to date have used metallic substrates. Specifically, bipolar lead-acid systems have utilized lead and alloys of lead for this purpose. The use of lead alloys, such as antimony, gives strength to the substrate but causes increased corrosion and gassing. In addition to the problems of forming a liquid tight seal between the metallic substrate and adjacent nonconductive case (frame) materials, substrate corrosion, weight and strength factors have also been unacceptable. Furthermore, any attempt to reduce weight has lead to increased problems of strength and corrosion. Accordingly, a different approach must be used if acceptable weight and life are to be simultaneously achieved.

Alternate approaches have included substrates of a synthetic resin such as polystyrene incorporating therein metal or graphite powder (U.S. Pat. No. 3,202,545), a plastic frame of polyvinyl chloride with openings carrying a battery active paste mixed with nonductive fibers and short noncontacting lead fibers for strengthening the substrate (U.S. Pat. No. 3,466,193) a biplate having a layer of zinc and a polyisobutylene mixed with acetylene black and graphite particles for conductivity of the plate (U.S. Pat. No. 3,565,694), a substrate for a bipolar plate including polymeric material and vermicular expanded graphite (U.S. Pat. No. 3,573,122), a rigid polymer plastic frame having a grid entirely of lead filled with battery paste (U.S. Pat. No. 3,738,871), a plastic thin substrate having lead stripes on opposite faces, the lead stripes being interconnected through an opening in the substrate, and retained by plastic retention strips (U.S. Pat. No. 3,819,412) and a biplate having a substrate of thermoplastic material filled with finely divided vitreous carbon and a layer of lead antimony foil bonded to the substrate for adhering active materials (U.S. Pat. No. 4,098,967).

Such prior biplate constructions were characterized by the support of active material on the biplate substrate and various physical configurations for purposes of strengthening the biplate. Conventional metallic substrates presented seal and corrosion problems.

SUMMARY OF THE INVENTION

This invention generally relates to a novel bipolar battery construction and a novel method of containment of the assembly of the battery components. The invention particularly relates to a biplate of conductive thermoplastic material, a separator plate adapted to carry active material, and means for containing and maintaining the active material and conductive biplate in operable assembly and electrical contact.

The present invention contemplates a lightweight bipolar battery construction having a plurality of spaced thin biplates each biplate being of composite thermoplastic material with conductive fibers such as carbon, graphite or metalic fibers serving as strengthening and conductive elements, each biplate having spaced lead stripes on opposite side surfaces in bonded electrical contact with the graphite fibers, nonstriped areas being provided with a protective coating. A plurality of thin separator plates of thermoplastic material are interleaved with the biplates, each separator plate having bonded thereto porous resiliently yieldable mats serving to carry active material. Each biplate is bonded to a casing member which in turn is bonded to adjacent casing members. The interleaved biplates and separator plates are held in a stack under compression and maintained in operable assembly with active material in contact with the lead stripes by external pressure means.

The present invention provides a battery construction which avoids many disadvantages of prior bipolar battery constructions such as excess weight, sealing and corrosion problems, off-gasing, and limited power and energy density and cycling life. The present invention provides a bipolar battery construction useful in virtually all battery applications particularly for electrical vehicles in which the ratio of energy and power to battery weight is critical for the distance range, speed and acceleration of the electrical vehicle.

The primary object of the present invention is to provide a bipolar battery construction of novel configuration and method of assembly.

An object of the invention is to provide a lightweight bipolar plate of thin rigid structure of high strength, more than adequate conductivity, and high corrosion resistance.

Another object of the present invention is to provide a biplate structure of composite thermoplastic material including embedded conductive fibers adapted to conductively interface with plated lead stripes on opposite side surfaces of the biplate.

Another object of the present invention is to provide a biplate structure which may be sealed to an adjoining case structure by thermal means such that the resulting seal is tight with respect to electrolyte ions.

Another object of the present invention is to provide a bipolar battery construction having thin separator plates of microporous thermoplastic material adapted to carry on opposite faces thereof active material in a resilient yieldable porous mat.

A further object of the present invention is to provide a battery construction wherein interleaved biplates and separator plates are maintained in operable assembly and electrical contact under compressive forces applied axially thereto by external pressure plates.

A further object of the present invention is to provide such a battery construction wherein the compressive forces containing the battery components serve to retain and prevent shedding of active material during battery operation and life.

A still further object of the present invention is to provide porous, fibrous mats which are bonded to opposite surfaces of the separation plates, which retain the active materials during assembly, operation and life, and which provide axial compliance and transverse paths for the exit of gases.

Other general objects of the present invention include the provision of a lightweight bipolar battery construction having improved power density, improved energy density, ease of manufacture, reduced cost of manufacture, a battery more readily maintained, a battery which permits the use of non-metallic materials thereby reducing substrate corrosion problems, while providing more effective utilization of active materials because of improved surface to volume ratios made possible by improved containment, reduced corrosion and reduced off-gassing.

Various other advantages and objects of the present invention will be readily apparent from the following description of the drawings in which an exemplary embodiment of the invention is shown.

IN THE DRAWINGS

DETAILED DESCRIPTION

Figure 1:
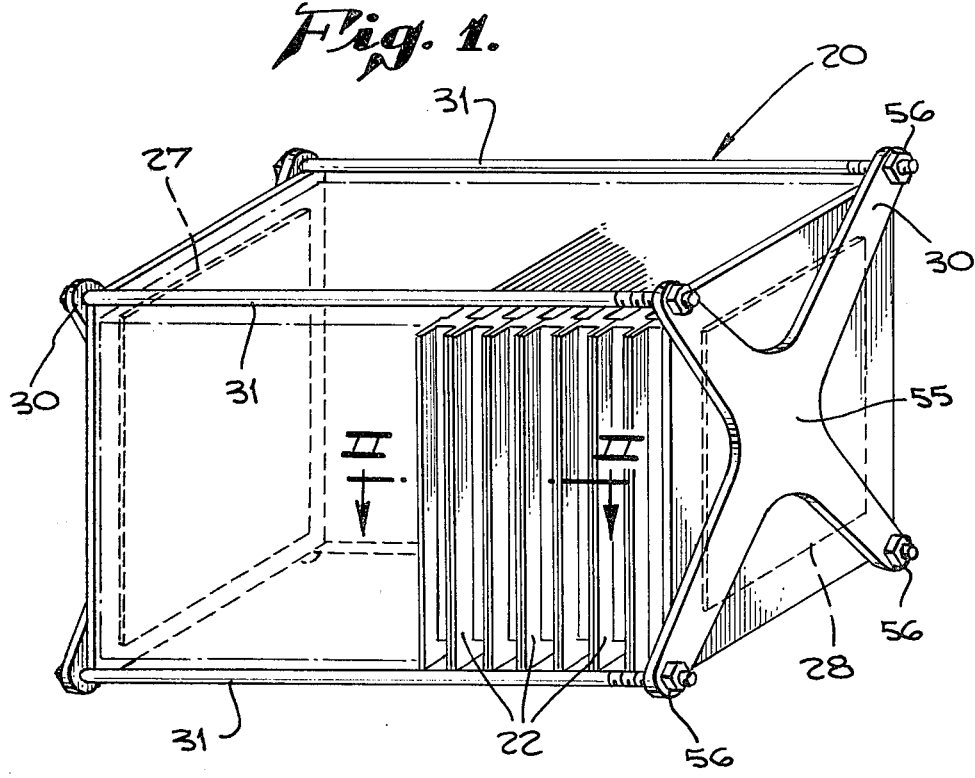
FIG. 1 is a side perspective view of a battery construction embodying this invention.
Figure 2:
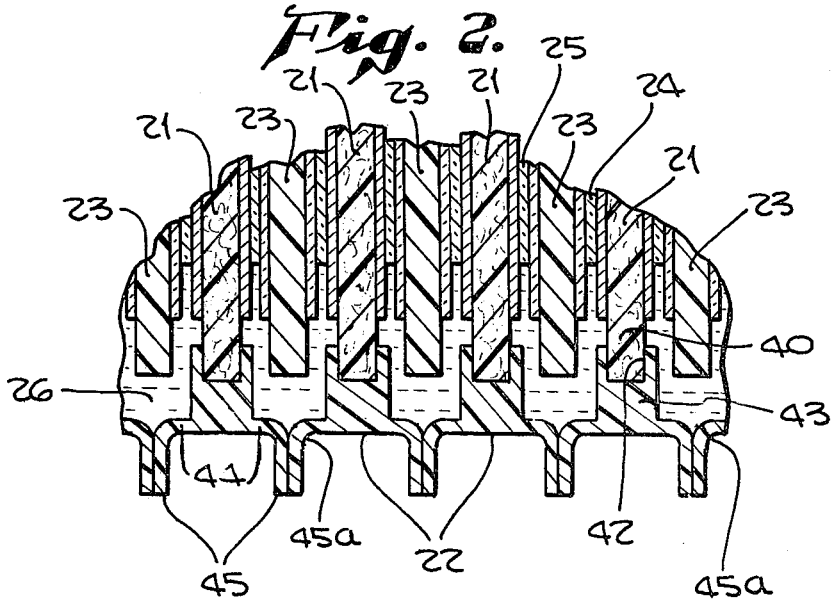
FIG. 2 is an enlarged fragmentary sectional view taken in the horizontal plane indicated by line II—II of FIG. 1.

In FIGS. 1 and 2 a bipolar battery construction embodying this invention is generally indicated at 20. Battery construction 20 generally comprises a plurality of conductive biplates 21, peripheral borders or margins thereof being supported and carried in peripheral insulating casing members 22. Interleaved and arranged between biplates 21 are a plurality of separator plates 23, the separator plates carrying positive active material 24 on one side thereof and negative active material 25 on the opposite side thereof. The casing members 22, together with the biplates 21 and separator plates 23, provide chambers 26 for containing electrolyte liquid. At each end of battery construction 20, standard biplates 21 interface to current collecting plates, where 27 is the negative collector plate and 28 is the positive collector plate. Externally of end collectors 27 and 28 are provided pressure members 30 interconnected by rods 31 having threaded portions for drawing the pressure members plates together and applying axial compression to the stacked arrangement of biplates and separator plates. With an alternative construction, the collecting plates and pressure members are integrated into one composite member for each end of the stack.

Figure 3:
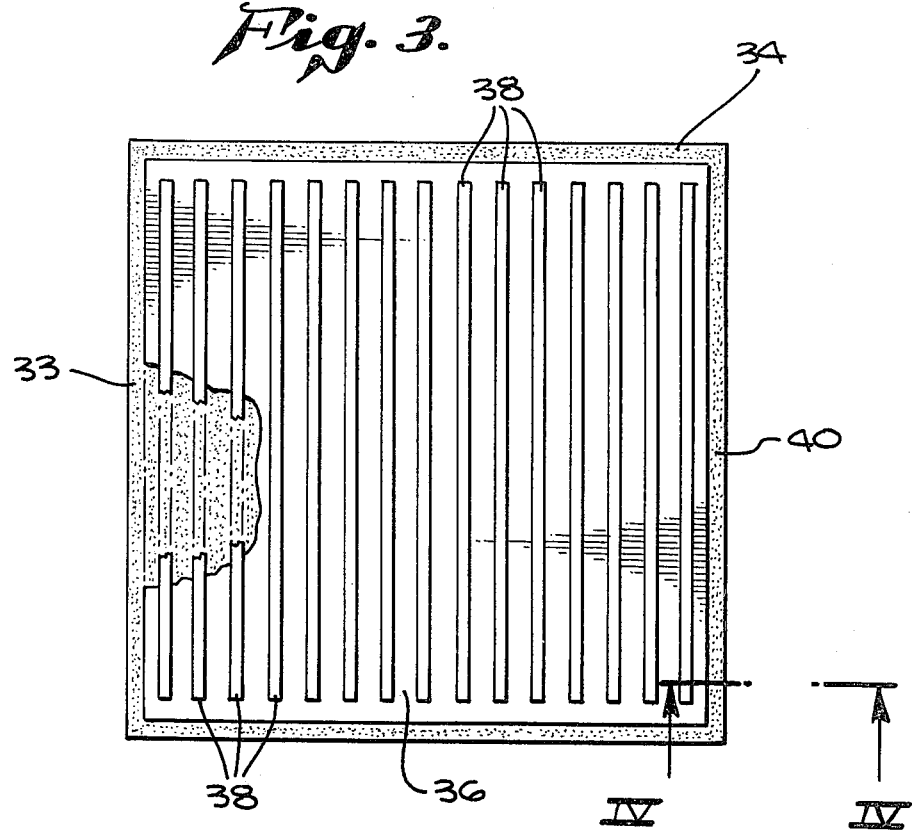
FIG. 3 is a side view of a biplate embodying the invention.
Figure 4:
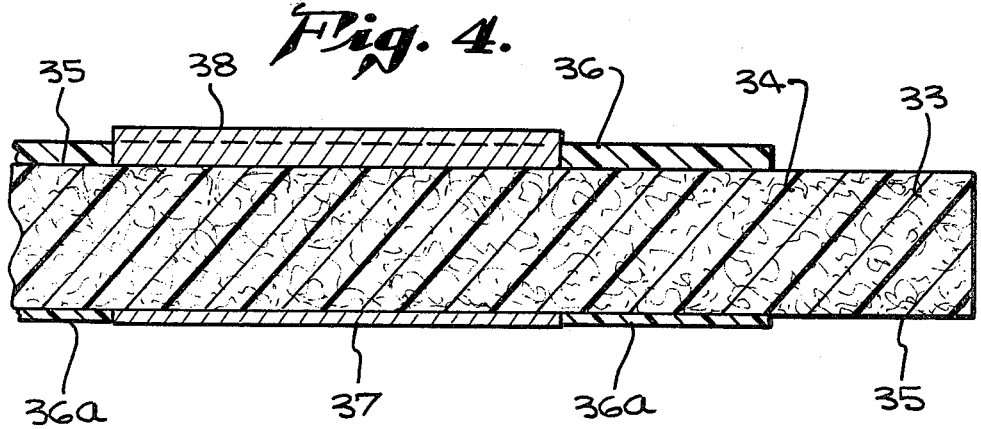
FIG. 4 is an enlarged fragmentary sectional view taken in the plane indicated by line IV—IV of FIG. 3.

Biplate 21 may comprise a composite, substrate sheet 34 (FIG. 3) including a continuous phase resin material which is nonconductive to electrolyte ions. The composite substrate sheet 34 also includes uniformly distributed, randomly dispersed conductive fibers 33 embedded in the material. The binder resin is a synthetic organic resin and may be thermosetting or thermoplastic. Thermoplastic resins are preferred since they do not require separate cure and can be bonded to adjacent structures by thermal bonding. Suitable thermoplastic resins are polyolefins such as polyethylene or polypropylene. The preferred conductive fibers are high or low modulus graphite fibers which are lightweight, sufficiently conductive and also provide excellent reinforcement. The fibers may be present in amounts from 30% to 65% by weight. A preferred composition for the biplate sheet comprises 50% by weight of graphite fibers dispersed in a polyethylene binder matrix. The composite substrate sheet 34 has substantially flat opposite side faces 35 which include at their surfaces exposure of portions of the embedded graphite fibers 33. The embedded graphite fibers not only provide electrical conductivity through the substrate sheet 34, but also impart to the thermoplastic material a high degree of stiffness, rigidity, strength and stability.

Substrate sheet 34 may be made in any suitable manner as by thoroughly intermixing the thermoplastic material in particle form with the graphite fibers. The mixture is heated in a mold and then pressure formed into a substrate sheet of selected size and thickness. After the sheet has been cured, the substantially flat side faces 35 may be readily treated or processed, as for example by buffing, to eliminate pinholes or other irregularities in the side faces.

The graphite fibers may comprise chopped or cut fibers having a suitable selected length, such as ½ inch. Such fibers may be obtained from tows each having 40,000 or 160,000 filaments in which the tows total cross-sectional area is 0.0033 square inches. Such graphite fibers may include treated or untreated fiber surfaces depending upon the thermoplastic material used. Chemically treated graphite fiber surfaces serve to promote bonding between the fiber and the thermoplastic material. A suitable commercially available graphite fiber is manufactured under the registered trademark "FORTAFIL" made and sold by Great Lakes Carbon Corporation of New York. A typical fiber property identified as FORTAFIL 3 includes

| | |
|---|---|
| Tensile Strength (KSI on 1" Gage Length) | 360 |
| Tensile Modulus (MSI) | 30 |
| Electrical Conductivity (ohm cm)$^{-1}$ | 570 |
| Oxidative Resistance (% Wt. loss after 700 hrs. at 316° C.) | 0.18 |

A typical graphite fiber property identified as FORTAFIL 5 includes

| | |
|---|---|
| Tensile Strength (KSI on 1" Gage Length) | 400 |
| Tensile Modulus (MSI) | 48 |
| Electrical Conductivity (ohm cm)$^{-1}$ | 1050 |
| Oxidative Resistance (% Wt. loss after 700 hrs. at 316° C.) | 0.0 |

It is understood that other conductive fibers and graphite fibers having different properties and manufactured by others may also be used to form the composite substrate sheet 34.

The biplate 21 also includes on each side face 35 a plurality of spaced parallel lead stripes 37 and 38. Lead stripe 37 on one side face 35, which may be the negative side of the biplate, may have a thickness less than the lead stripe 38 on the opposite side face 35 which may be the positive side of the biplate 21. For example, the negative lead strip 37 may be 0.001 inches and the positive lead stripe 38 may be 0.005 inches. The negative lead stripe is thinner because it in unaffected by corrosion. The positive lead stripe is affected by anodic corrosion. The expected life of the positive lead stripe 38 subject to such corrosion in a battery construction of the present invention may be on the order of 5 years. Lead stripes 37 and 38 are of the same width and are relatively narrow. Such narrow stripes provide for reduced weight of the biplate. The total stripe mass maintains interfacial conductivity with the composite graphite fiber substrate sheet 34, as well as with active material surfaces as later described. After application of the lead stripes, any imperfections in the stripe surfaces may readily be treated or processed, as for example by buffing to provide a finished smooth surface.

Preferably, the lead stripes are bonded to the composite substrate sheet 34 by known plating processes. On the positive side face 35, the facial areas between lead stripes 38 are covered by a coating of corrosion resistant resin 36 suitably a fluorocarbon resin such as Teflon (polytetrofluoroethylene) which protects against anodic corrosion of the adjacent graphite fibers and polyethylene of the substrate 34. On the negative side face 35, facial areas between lead stripes 37 may be protected by a thin coating of resin impermeable to electrolyte such as a polyethylene coating 36a.

In fabrication of the biplate 21 and after the composite substrate sheet 34 has been formed, a thin Teflon sheet may be bonded to the positive side surface 35. Prior to bonding, window like openings corresponding in length and width to the lead stripes are cut. Plating thereafter will bond the lead in stripes 38 to the exposed conductive graphite surfaces on the substrate side face 35. The same fabrication process may be utilized on the negative side face 35 to coat the nonstriped areas with polyethylene or other like material. Plating of the negative stripes may be achieved as with the positive stripes.

A completed biplate 21 may then comprise a substrate sheet 34 having an exemplary thickness of 0.020 inches, a plurality of spaced positive lead stripes having an exemplary thickness of 0.005 inches, and a plurality of negative lead stripes 37 having an exemplary thickness of 0.001 inches. Outwardly of the area of the biplate 21 occupied by the lead stripes, a peripheral margin or border 40 is provided for assembly purposes as later described. Biplate 21 is lightweight, rigid, has excess electrical conductivity for a battery application, is structurally stable over long periods, the joint lines between the lead stripe edges and the contiguous protective coatings is resistant to penetration by the electrolyte so that the composite substrate is protected from corrosion and structural deterioration.

As best seen in FIG. 2, peripheral margins 40 of substrate sheet 34 may be received within grooves 42 provided in inwardly directed rib-like bodies 43 formed on casing member 22. Casing member 22 may be made of suitable plastic material and peripheral borders or margins 40 may be suitably bonded or adhered to the internal surfaces of groove 42 in sealing relation therewith. It should be noted that the protective coatings on the substrate sheet 34 may extend to within the groove 42 so that when the substrate is heat bonded, for example, to the casing member 22, a liquid-tight corrosion resistant seal is provided.

Each casing member 22 may extend along at least three side edges of the biplate 21 and securely supports and positions biplate 21. Each casing member 22 also includes transverse flange portions 44 which terminate in outwardly directed flanges 45 adapted to seat against and to be bonded and secured to the flange 45 of an adjacent casing member 22 during assembly of the battery construction. Adjacent flanges 45 of adjacent casing members 22 may be bonded together by any suitable means, such as by heat.

Figure 5:
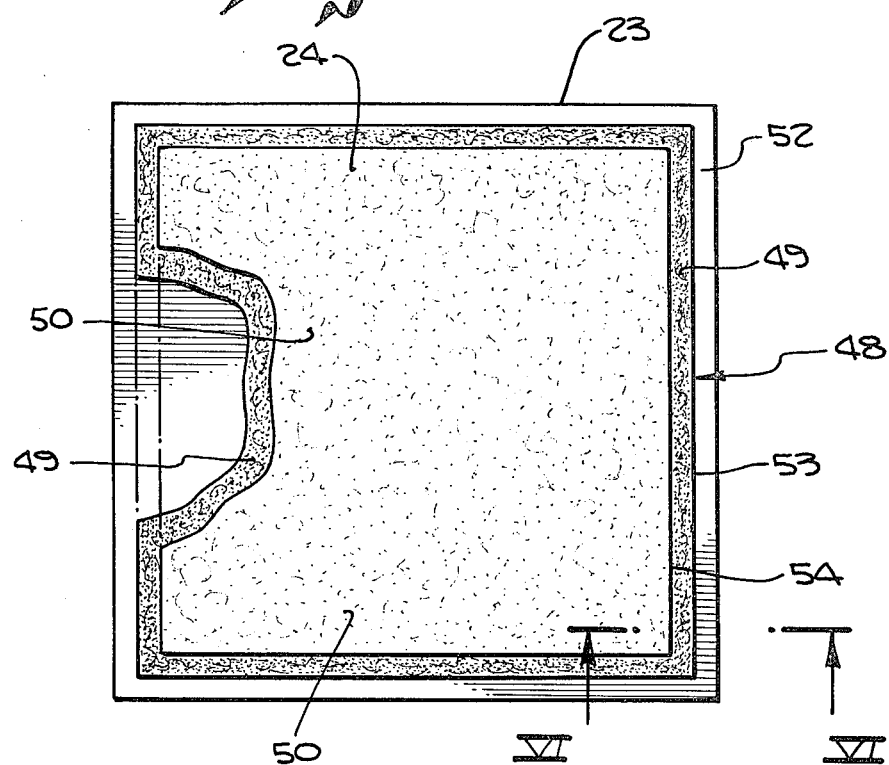
FIG. 5 is a side elevational view of a separator plate embodying this invention, the separator plate having portions broken away to illustrate the various layers of material.
Figure 6:
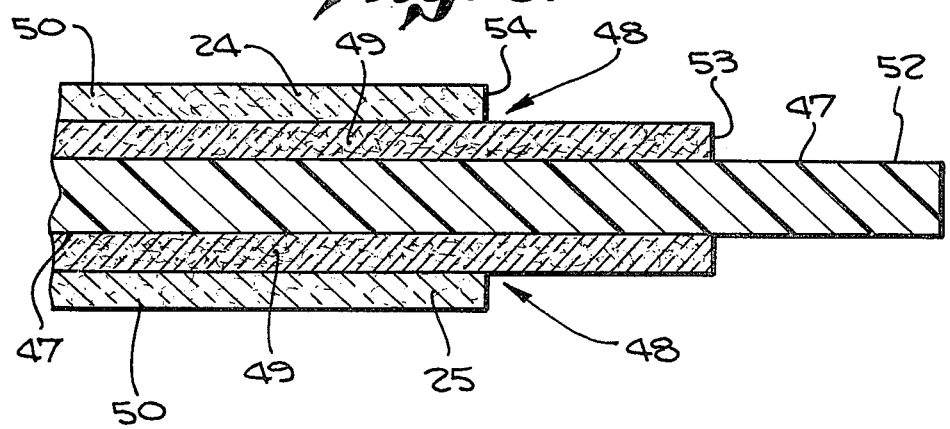
FIG. 6 is an enlarged fragmentary sectional view taken in the plane indicated by line VI—VI of FIG. 5.

Separator plate 23 (FIGS. 5, 6) serves to support the positive active material 24 and the negative active material 25 and may be made of a suitable synthetic organic resin, preferably a thermoplastic material such as microporous polyethylene. Separator plate 23 may correspond in shape and size to substrate sheet 34. Separator plate 23 may have bonded to opposite flat side surfaces 47 porous, fibrous mats 48 made of suitable nonconductive fibers such as glass. Glass mats 48 are made to have a high density of fiberglass at the planar portion 49 adjacent to side surfaces 47 of the polyethylene separator plate 23. Portions of fiberglass mats 48 distal from side surfaces 47 as at 50 are relatively open and of low density. Bonded to and forming part of the distal portions 50 of one mat 48 is positive active material 24 ($PbO_2$) and bonded to the other distal mat portion 49 on the opposite side of separator plate 23 is negative material 25 (Pb). The high density proximate portions 49 of the glass mats prevent contact of the active materials with the separator plate 23.

One method of applying the active material to the glass mats is to press the active materials into the voids of the distal portions. Another suitable method is to press the active materials into matricies or screens and then apply the filled screens to mats which are previously bonded to the separator plate. Glass mats 48 are resiliently yieldable, porous for passage of hydrogen and oxygen gases and contain a portion of the electrolyte liquid within its voids. Separator plate 23 has peripheral border or margin 52 which extend beyond the peripheral edges 53 of the glass mats 48. The positive material carried by glass mat 48 is provided with edges 54 which may be spaced inwardly from the edges of the glass mat 48, the overall configuration of the positive material corresponding at least to the overall configuration of the area occupied by the lead stripes on the biplate.

Separator plate 23, with attached glass mats 48 which contain the active materials provide easy fabrication and a generally compliant axially resiliently yieldable unit which cooperates with the biplates in a novel manner during assembly and in maintenance of the battery construction.

It may be noted that the glass mat and positive material carried thereby may be slightly thicker than the glass mat and negative material carried on the opposite side of the separator plate. An exemplary separator may comprise a sheet of thermoplastic material of 0.020 inches thickness, a glass mat and negative material thickness of 0.020 inches, and a glass mat with positive material a thickness of 0.025 inches.

In assembly of the bipolar battery construction, each biplate 21 with the protective coating and lead stripes thereon, may be assembled with its associated casing member 22 by inserting peripheral margins 40 of substrate 34 into grooves 42 of casing member 22. The margins 40 may be bonded to the casing member and provided sealed relation therewith. Biplates 21 and casing members 22 may be aligned and stacked with separator plates 23 therebetween and arranged with casing member flanges 45 in abutting relation. In such an arrangement, space between adjacent biplates 21 is occupied by separator plates 23 with the exposed surface of the active material on the separator plates in parallel relation with the biplates and in contact therewith. Each separator plate 23 may be positioned in such relation by either suitable temporary alignment supports or integral supports associated with the case members. Collector plates 27 and 28 may then be arranged at opposite ends of the interleaved stack of biplates and separator plates. Flanges 45 of adjacent casing members 22 may be bonded together. Pressure members 30, each comprising a suitable configuration, in this instance, in the form of an X with an enlarged intersectional area 55, may be positioned at opposite ends of the stacked arrangement and interconnected by rods 31 extending between pressure members 55 and located at top and bottom corner edges of the stacked arrangement. Rods 31 are provided with suitable fastening nuts 56. As the pressure members are drawn together by the tightening of nuts 56, the interleaved stacked arrangement of biplates 21 and separator plates 23 are urged together and held under a selected compressive force. Under such compressive condition, the battery construction may be readily handled as a unit.

It should be noted that the flange portions 44 of case members 22 may be joined to flanges 45 of the case members with radii of curvature as at 45a sufficiently large or provided with a suitable section of material to provide adequate compliance so that when axial pressure is applied to the stack, the needed compression of the case members can readily be achieved.

It should also be noted that the assembled battery construction under selected compression includes operating and maintenance advantages as mentioned below. Upon compression of the interleaved biplates and separator plates, the active material on the separator plates is resiliently, yieldably urged against the lead stripes on the biplates. Because the glass mats are resiliently yieldable and the polyethylene separator plate 23 is axially yieldable, the compressive forces acting through the battery construction over the area of the rigid biplates 21 are relatively uniform. The active material, which is under some compression, is readily held in place on the separator and tendency of the active material to shed or fall during extended battery operation is controlled and reduced during the life of the battery. Further, the compressive forces acting on the interleaved biplates and separator plates, the latter of which in a sense floats between the adjacent biplates and is not connected to the casing member, serves to maintain uniform conductive relation of the active material with the lead stripes on the biplate during the life of the battery. The containment of the active material on the separator plate in conductive relation with the biplate by the axial compression of the stacked arrangement improves the life cycle of the battery.

Battery life is also affected by off-gassing. In prior proposed batteries, the amount of gas given off was a function of the amount of antimony in the grid structure of the biplate. The battery construction of this invention employs no antimony and no grid. The problems of active material shedding and electrical contact are dealt with by the combination of axial pressure containment and support provided by the fiber mats. The present battery construction has a substantially reduced gassing rate and thereby the addition of water to the electrolyte is needed relatively infrequently. Because there is less evolution of hydrogen gasses, the safety of the battery is enhanced, particularly during the charging cycle.

It will be readily understood by those skilled in the art that sealing, corrosion, and weight problems associated with conventional metallic substrates are obviated by the use of a composite thermoplastic graphite fiber conductive substrate of the present invention. It should also be noted that while the graphite fiber conductivity is relatively low, such graphite fibers can be utilized since the comparative L/A ratios associated with the biplate are very small. The use of nonconductive thermoplastic materials facilitates bonding of the fiber composite biplate with the non-composite, non-conductive thermoplastic materials used in the peripheral case.

It should also be noted that the separator plates carry graded porous resilient mats which support the active material. The support of the active material on the glass mats facilitates fabrication and after assembly the glass mats provide yieldable axial compliance of the stack of biplates and separators to assure uniform containment pressure and contact of the active material with the lead stripes. The mat on the positive side of the separator also protects the thermoplastic material of the separator from oxidation caused by contact with the positive material. In addition, the glass mats provide transverse porosity for transport of hydrogen and oxygen gases.

Since antimony is eliminated in the present battery construction, the gasing rate is considerably reduced and the addition of water to the electrolyte which permeates the interstitial spaces and porous glass mats is needed approximately only one-tenth as often. Further, the problem of active material adhesion which in conventional batteries is aided by the addition of antimony to the positive grids is solved in the present battery construction by pressure containment.

It will be understood that various modifications and changes may be made in the bipolar battery construction described above which come within the spirit of this invention and all such changes and modifications coming within the scope of the appended claims are embraced thereby.

We claim:

1. In a bipolar battery construction, the combination of:
    a plurality of spaced conductive composite thermoplastic biplates having opposite flat side surfaces;
    a plurality of spaced parallel lead stripes bonded to each side surface in conductive relation thereto;
    a nonconductive coating covering nonstriped areas of at least one side surface of the biplate;
    a plurality of thermoplastic microporous separator plates, each positioned between spaced adjacent biplates;
    each separator plate having means for carrying active material on opposite faces of the separator plate; and
    means to retain said biplates and said separator plates in assembly and under selected compression for maintaining said active material in conductive contact with the lead stripes on said biplates.

2. A battery construction as stated in claim 1 wherein said plurality of biplates and plurality of separator plates are in stacked arrangement; and said means to retain said stacked arrangement in assembly includes
 a pressure member at each end of said stack arrangement; and
 means for drawing said pressure members toward each other.

3. A battery construction as stated in claim 2 wherein said means for drawing said pressure members toward each other includes external rods interconnecting said pressure members.

4. In a battery construction as stated in claim 1 wherein each biplate includes a peripheral margin, and an external casing member connected to said peripheral margin of said biplate.

5. A battery construction as stated in claim 4 wherein said casing members include means for securing adjacent casing members together to provide a sealed liquid-tight casing.

6. A battery construction as stated in claim 4 wherein each of said casing members includes
 means to provide compliance of adjacent casing members when secured together upon application of axial pressure thereto.

7. A battery construction as stated in claim 1 wherein said thermoplastic composite biplate includes conductive fibers embedded therein.

8. A construction as stated in claim 7 wherein said conductive fibers are graphite fibers cut and randomly distributed in the thermoplastic biplate.

9. A battery construction as stated in claim 1 wherein said means for carrying said active material on opposite faces of said separator plate includes a resiliently yieldable mat of nonconductive fibers, the density of said mat being greater proximate to said separator plate than remote from said separator plate.

10. A battery construction as stated in claim 1 wherein nonstriped areas on both surfaces of said biplate are provided a nonconductive coating.

11. In a stiff, thin, lightweight, composite, conductive biplate, the provision of:
 a battery plate substrate of thermoplastic material including graphite fibers embedded in the thermoplastic material for conductivity therethrough and strength; and
 spaced lead stripes plated on said side surfaces of said substrate in conductive relation with said graphite fibers.

12. A biplate as stated in claim 11 including a protective coating on non-plated areas of said side surfaces of said substrate.

13. A biplate as stated in claim 11 wherein the ratio of lead stripe width to lead stripe separation is in the order of about 0.02 to 0.1.

14. A biplate as stated in claim 11 wherein said lead stripe on one side is thicker than the lead stripe on the opposite side.

15. A biplate as stated in claim 11 wherein said graphite fibers comprise approximately 50% by weight of said substrate.

16. A biplate as stated in claim 11 wherein said graphite fibers are ½ inch chopped fibers.

17. A biplate as stated in claim 11 wherein said lead plated stripes are provided with finished surfaces.

18. In a bipolar battery construction, the combination of:
 a biplate of conductive composite plastic material having lead stripes on opposite faces in conductive relation to said conductive material;
 a separator plate supporting active material in contact with the biplate; and
 means for applying and maintaining said biplate in pressure contact with said active material.

19. A biplate for a battery comprising:
 a sheet of nonconductive, synthetic organic resin binder material having randomly dispersed therein conductive fibers;
 a plurality of spaced, parallel lead stripes applied to opposed faces of the sheet and in electrical contact with said fibers;
 the facial areas between said stripes on one of said faces being coated with a corrosion resistant resin; and
 the facial areas between said stripes on the opposed face being coated with a resin impermeable to electrolyte.

20. A biplate according to claim 19 in which the conductive fibers are high modulus graphite fiber.

21. A biplate according to claim 20 in which the binder resin is a thermoplastic resin.

22. A biplate according to claim 21 in which the binder resin is a polyolefin.

23. A biplate according to claim 22 in which the binder resin is polyethylene.

24. A separator plate for a battery comprising:
 a microporous sheet of synthetic organic resin;
 a porous layer bonded to opposed surfaces of the sheet;
 a layer of positive active material being present on the outer surface of one of said porous layers; and
 a layer of negative active material being present on the outer surface of the other of said porous layers.

25. A plate according to claim 24 in which the positive active material is $PbO_2$ and the negative active material is Pb.

26. A plate according to claim 24 in which the porous layer comprises fiberglass.

27. A plate according to claim 26 in which at least one of said layers increases in density from the outer surface toward the sheet.

28. A plate according to claim 24 in which the sheet comprises a thermoplastic polyolefin.

29. A plate according to claim 28 in which the polyolefin is polyethylene.

30. A plate according to claim 27 in which at least one of said layers extends into said porous fiberglass layer.

31. In a bipolar battery construction the combination of:
 casing means of thermoplastic material;
 a plurality of spaced biplates of thermoplastic material having lead stripes on opposite faces of each biplate;
 said casing means and said biplates being bonded together and providing chambers for containing electrolyte fluid;
 a plurality of separator plates received in said chambers;
 each separator plate having porous mats on opposite faces;
 active material carried by said porous mats; and
 tension means for retaining said casing means, biplates, separator plates and active material under selected compression and in assembled operable relation.

* * * * *